United States Patent
Rakshit et al.

(10) Patent No.: US 11,589,407 B2
(45) Date of Patent: Feb. 21, 2023

(54) DYNAMICALLY GROUPING COMMUNICATIVELY CONNECTED DEVICES BASED ON DEVICE LOCATION AND TRACKED MOTION

(71) Applicant: International Business Machines Corporation, Armonk, NY (US)

(72) Inventors: Sarbajit K. Rakshit, Kolkata (IN); Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 17/303,722

(22) Filed: Jun. 6, 2021

(65) Prior Publication Data

US 2022/0394793 A1    Dec. 8, 2022

(51) Int. Cl.
*H04W 76/14* (2018.01)
*H04W 76/15* (2018.01)
*H04W 4/029* (2018.01)
*G06F 3/01* (2006.01)
(Continued)

(52) U.S. Cl.
CPC ............. *H04W 76/15* (2018.02); *G06F 3/011* (2013.01); *H04W 4/023* (2013.01); *H04W 4/029* (2018.02); *H04W 12/55* (2021.01)

(58) Field of Classification Search
CPC ..... H04W 76/15; H04W 4/029; H04W 12/55; H04W 4/023; G06F 3/011
See application file for complete search history.

(56) References Cited

U.S. PATENT DOCUMENTS

| 10,880,382 B2 | 12/2020 | Kunjukrishnan | |
| 11,228,887 B2 * | 1/2022 | Kesavan | ................. H04W 4/70 |
| 11,328,595 B1 * | 5/2022 | You | ........................ G08G 1/146 |

(Continued)

FOREIGN PATENT DOCUMENTS

IN         20882015         10/2016

OTHER PUBLICATIONS

Kwoon, Young-Hoo, "Angular Distance vs. Relative Angular Position", last printed Jun. 4, 2021, 4 pages, <http://www.kwon3d.com/theory/uangle/dist.html>.

(Continued)

*Primary Examiner* — Gerald Johnson
(74) *Attorney, Agent, or Firm* — Michael A. Petrocelli

(57) ABSTRACT

A computer automatically groups IoT devices. The computer identifies at least one individual interaction zone within an operating environment, the at least one individual interaction zone characterized by pre-established device mounting regions each associated with a device category. The computer receives a location indicating signal from an IoT device located within the at least one individual interaction zone. The computer, in response to receiving the location indicating signal and based at least in part thereon, the computer recognizes that the IoT device is occupying one of the device mounting regions. In response to the recognition, the computer determines that the IoT device belongs to the device category associated with the occupied mounting region. In response to the determination, the computer adds the device to an IoT device group associated with the individual interaction zone associated with the occupied mounting region.

20 Claims, 10 Drawing Sheets

(51) Int. Cl.
*H04W 4/02* (2018.01)
*H04W 12/55* (2021.01)

(56) References Cited

U.S. PATENT DOCUMENTS

| | | | |
|---|---|---|---|
| 2016/0150350 A1 | 5/2016 | Ingale | |
| 2019/0380037 A1* | 12/2019 | Lifshitz | H04W 8/08 |
| 2020/0060617 A1 | 2/2020 | Dusan et al. | |
| 2020/0081054 A1* | 3/2020 | Pal | G01R 31/088 |
| 2020/0145415 A1* | 5/2020 | Berdy | H04L 63/0876 |
| 2021/0103842 A1* | 4/2021 | Hardin | H04W 12/68 |
| 2022/0171411 A1* | 6/2022 | Chiocco | B64C 39/024 |
| 2022/0303724 A1* | 9/2022 | Ahrens | G08B 25/006 |

OTHER PUBLICATIONS

Malewar, Amit, "System helps smart devices find their position", Tech Explorist, Oct. 3, 2019, 3 pages, <https://www.techexplorist.com/system-helps-smart-devices-position/26832/>.

Matheson, Rob, "System helps smart devices find their position", MIT News, Oct. 2, 2019, 6 pages, <https://news.mit.edu/2019/iot-smart-device-position-1003>.

Mell, et al., "The NIST Definition of Cloud Computing", National Institute of Standards and Technology, Special Publication 800-145, Sep. 2011, 7 pages.

Raghunath, et al., "Device Disambiguation for a Retail Shopping Scenario", IBM Research Report, RC22500 (W0206-126), Jun. 24, 2002, 6 pages, <https://dominoweb.draco.res.ibm.com/1fcca5f87a97b95d85256d7a005b6492.html>.

Zhanikeev, Marat, "Ultrasound Relative Positioning for IoT Devices in Dense Wireless Spaces", SCAI/RTCSA 2018 @ Hakodate, 22 pages, <https://www.slideshare.net/zhopasushami/ultrasound-relative-positioning-for-iot-devices-in-dense-wireless-spaces?from_action=save>.

Zhuang, et al., "Video Motion Capture Using Feature Tracking and Skeleton Reconstruction", Proc. International Conference on Image Processing (ICIP 1999), Oct. 1999, 5 pages, <http://cvlab.cse.msu.edu/pdfs/icip99.pdf>.

\* cited by examiner

| Device Name | Relevant Device Categories | Preferred Wearing Location | Relevant Activity |
|---|---|---|---|
| Hard Hat | Headgear | Top of Head | #1, #2 |
| Reflective Vest | Chest | Torso | #2 |
| Belt | Waist-located transmitter | Waist | #1,#2 |
| Gloves | Hand Protection | Hand | #1,#2 |
| Footwear | Foot Protection | Foot | #1,#2,#3,#4 |

↖702  ↖704  ↖706  ↖708

DYNAMICALLY GROUPING COMMUNICATIVELY CONNECTED DEVICES BASED ON DEVICE LOCATION AND TRACKED MOTION

BACKGROUND

The present invention relates generally to the pairing IoT devices, and more specifically, to dynamically linking multiple devices to users.

Sensor and other devices that consume low amounts of power and provide near-constant sources of environmental and other data are often referred to as Internet of Things "IoT" devices. These device are often portable and may, in some cases, be worn or carried by about a user. In some settings, it is common for a user to interact with multiple such devices at one time. In many case, an IoT device is shared by several users over various slices of time. For example, in modern factories, warehouses, hospitals, oil drilling platforms, maintenance services, and several other industries, employees wear various IoT enabled devices to facilitate the ease, accuracy and speed of work. These devices are typically assigned to a specific user, are reusable, and the same user may interact with multiple iterations of a certain kind of device to accomplish tasks at different times (e.g., different days, over the course of multiple shifts, etc.). Examples of such IoT enabled devices include gloves, helmets/caps, body worn cameras, glasses/goggles, virtual reality googles, shoes, safety belts, vests, watches, gas detectors, protective gear, other wearables and so forth.

Unfortunately, the process of associated each of these device can be cumbersome. In certain work settings (e.g., emergency response teams or other groups for whom time is of the essence and quick response is desired), a need to connect multiple devices manually can be prohibitively slow, prohibiting successful completion of work tasks and, in some cases creating danger for the user and those with whom the user interacts.

SUMMARY

According to one embodiment, a computer-implemented method of automatically grouping IoT devices, includes identifying, by a computer, at least one individual interaction zone within an operating environment. The at least one individual interaction zone characterized by pre-established device mounting regions each associated with a device category. The computer receives a location indicating signal from an IoT device located within the at least one individual interaction zone. In response to receiving the location indicating signal and based at least in part thereon, the computer recognizes that the IoT device is occupying one of the device mounting regions. In response to this recognition, the computer determines that the IoT device belongs to the device category associated with the occupied mounting region. The computer, in response to the determination, adds the device to an IoT device group associated with the individual interaction zone associated with the occupied mounting region. According to aspects of the invention, the mounting regions substantially coincide with anatomically preferred device wearing locations associated with a stick figure model representing a user. According to aspects of the invention, the computer tracks, between a first time and a second time, a time-indexed sequence of locations for at least one of the IoT devices, The computer determines the sequence of locations substantially corresponds to a predetermined trigger motion; and in response to the substantial correspondence determination, initiating a preselected pattern induced response sequence associated with the trigger motion. According to aspects of the invention, the IoT device is adapted to alternately occupy a secured state and a removed state, and the computer tracks, between a first time and a second time, a time-indexed sequence of IoT device states. The computer determines that the IoT device belongs to the device category associated with the occupied mounting region occurs in response to the computer recognizing that the device state has changed from removed to secured. According to aspects of the invention, the at least one individual interaction zone includes a first individual interaction zone and a second individual interaction zone, and wherein the first and second interaction zones each have an associated IoT device group. According to aspects of the invention, the computer records for each IoT device group, a group formation time. The computer determines at a second time, that an IoT device in the first individual interaction zone IoT device group at the first IoT device group formation time has relocated to a device mounting region associated with the second individual interaction zone. The computer, in response to relocation determination, assigns the relocated device to the IoT device group associated with the second individual interaction zone. According to aspects of the invention, the pattern induced response sequence includes determining by the computer at the second time whether the IoT device belongs to the device category associated with the occupied mounting region. According to aspects of the invention, the pattern induced response sequence includes, enacting a capture activity associated with the IoT device.

According to another embodiment, a system to automatically group IoT devices, which comprises: a computer system comprising a computer readable storage medium having program instructions embodied therewith, the program instructions executable by a computer to cause the computer to: identify at least one individual interaction zone within an operating environment, the at least one individual interaction zone characterized by pre-established device mounting regions each associated with a device category; receive a location indicating signal from an IoT device located within the at least one individual interaction zone; responsive to receiving the location indicating signal and based at least in part thereon, recognizing that the IoT device is occupying one of the device mounting regions; responsive to the recognition, determining that the IoT device belongs to the device category associated with the occupied mounting region; and responsive to the determination, adding the device to an IoT device group associated with the individual interaction zone associated with the occupied mounting region.

According to another embodiment, a computer program product to automatically group IoT devices, the computer program product comprising a computer readable storage medium having program instructions embodied therewith, the program instructions executable by a computer to cause the computer to: identify, using the computer, at least one individual interaction zone within an operating environment, the at least one individual interaction zone characterized by pre-established device mounting regions each associated with a device category; receive, using the computer, a location indicating signal from an IoT device located within the at least one individual interaction zone; responsive to receiving the location indicating signal and based at least in part thereon, recognizing, using the computer, that the IoT device is occupying one of the device mounting regions; responsive to the recognition, determining, using the computer, that the IoT device belongs to the device category associated with the occupied mounting region; and responsive to the determination, adding, using the computer, the device to an IoT device group associated with the individual interaction zone associated with the occupied mounting region.

The present disclosure recognizes and addresses the shortcomings and problems associated with automatically identifying which IoT devices are being used by a given user.

Aspects of the invention can add devices (including IoT devices) to a group of devices associated with a user, based on recognizing pre-recorded or predicted user device movement patterns by a computer.

Aspects of the invention will decouple devices when removed from an area associated with a assigned initial user, dynamically recoupling (e.g., reassigning, re-pairing, etc.) the device to a new user if transferred to an area associated with the new user.

Aspects of the invention reduce the burden of pairing mobile, wearable, and pervasive devices, which communicate with each other to provide services (e.g., IoT devices). Aspects of the invention simplify the nature of the dynamically pairing devices (e.g., when adding phones and other connected assistants to our various work, living, and leisure environments.

Aspects of the invention allow multipole IoT devices to be used by different people at different times, transferred to different work locations, and used in different contextual situations. Aspects of the invention overcome difficulties associated with permanently pairing devices that may realistically be transferred among multiple users and user device groups over time. Aspects of the invention overcome difficulties associated with manually pairing devices, especially where many devices are used at one time, and it settings where rapid device pairing is required. Aspects of the invention also ease the use of connected devices that need to be assigned to different groups after periodic for cleaning, re-calibration, and other forms of maintenance.

Aspects of the invention identify which IoT devices are being used by one user. According to aspects of the invention, mobility patterns of a skeletal representation (e.g., a stick figure model) are observed and when observed user motion matches pre-captured motion patterns, various activities (including pairing of devices, causing a device to enter a capture mode) may be triggered.

According to aspects of the invention, the IoT devices are capable of sending the devices type, location and accelerometer readings continuously to our system. There may be another device on the worker such as a badge or a phone that provides information about monitored characteristics associated with a given user.

According to aspects of the invention, each IoT device is able to indicate whether the device is in "worn state" or a "removed state" (e.g., whether items with clasps, straps, buckle and so forth are securely fastened. According to aspects of the invention, a change of state between the worn and removed states will trigger the pairing or unpairing process.

According to aspects of the invention, the mobility pattern and joints of the skeletal representation of anatomically-preferred wearing locations help with localization and correlation (e.g., item disambiguation). Aspects of the invention consider types of devices expected to be used in various mounting regions associated with a user stick figure model and can ensure the correct type of device is used (e.g., assigned to the user) when in the expected region (head, torso, waist, hands, wrist, foot, etc.) associated with the user model. Aspects of the invention ensure devices are use in proper locations. Preferred regions correlate with these locations, and aspects of the invention promote proper device use in the anatomically preferred locations (e.g., gloves will be worn on the hand, goggles over the eyes/head, belt over the waist, watch over the wrist, etc.).

Aspects of the invention ensure devices associated with a given user will be dynamically be paired based on user motion, and the grouped devices will be dynamically removed from groups (and subsequently re-grouped) when removed by a user and transferred to another user.

According to aspects of the invention, upon detection of being in a worn state, reusable IoT devices (e.g., gloves, helmet, safety jacket, shoes, wearables, etc.) will ping each other within defined individual user proximity distance, and with skeleton stick figure analysis of users, aspects of the invention will assign IoT devices to groups associated with the individual users, (e.g., which reusable IoT devices are associated with a first user, which IoT devices are associated with a second user, etc.). According to aspects of the invention, the IoT devices associated with (e.g., appropriately worn by) users in the operating environment will be auto-paired (assigned to groups associated with the users).

According to aspects of the invention, if any reusable IoT device is removed by a user or handed over to another user for use, then with context aware time-interval, the proposed system will be performs a skeleton stick figure analysis, and identifies which IoT device are to be un-paired from an individual interaction zone associated with the initial user and paired an individual interaction zone associated with a second user. For example, when User A removes a helmet and hands it to User B who then wears it, aspects of the present invention remove the helmet (e.g., unpair) the helmet from a group associated with user A and adds the helmet to a group associated with user B. According to aspects of the invention, this transfer is aided by use of skeleton stick figure analysis for device movement and location relative to user A and user B).

According to aspects of the invention, when devices in multiple user interaction zone are linked to device groups associated with users in user interaction zones, aspects of the invention create a multi-user, collaborative operating environment that cooperatively considers IoT device feeds (e.g., the devices in groups associated with user interaction zone for User A, B, C, and D cooperate to provide information about individual users and the entire group of users).

Aspects of the invention historically track grouped IoT device metadata (e.g., pairing and un-pairing patterns, types of activities the users are performing, location and timing of activities, relative movement of the IoT devices etc.) and identifies relevant time intervals associated with expected device movement. Aspects of the invention assist with device grouping, validating which IoT devices are belongs to a given user at an expected time.

Aspects of the invention, will include personal IoT devices (e.g., a personal mobile phone if desired by the user) when generating device groups during operation.

Aspects of the invention will, if multiple individual interaction zones are present in an operating environment, identifying which reusable IoT devices should be paired together for better collaborative working environment. For example, when skeleton stick figure analysis of several users exhibits motion indicative of a cooperative task, device signals from the relevant users will be grouped accordingly).

Aspects of the invention improve user safety by providing motion data that can identify repetitive or otherwise harmful activities being undertaken by a user and can provide proactive feedback.

Aspects of the invention are able to identify when equipment (e.g., IoT devices) preferred for certain tasks are worn incorrectly or are missing and can provide proactive feedback.

Aspects of the invention automatically link equipment (e.g., IoT devices) to users as needed to ensure users are monitored as desired to maintain good health.

Aspects of the invention historically capture reference motion (e.g., stick figure model movements) associated with various tasks likely to be performed by uses associated with the operating environment (e.g., firefighting tasks for firefighter users, etc.). The models will store information about body movements associated with the expected tasks (e.g., various hand movement patterns while spraying a hose, leg movement patterns while conducting rescues, etc.) During operation, the IoT device sensors will be note user movements and look for movements that match recorded patterns. This motion pattern recognition improves system device group timing and accuracy by indicating possible key moments in particular tasks (stressful manoeuvres, expected event sequences, shift changes, etc.) and then taking relevant action (e.g., confirmation of current group assignment accuracy, initiation of various triggered events, and other pattern induced responses selected by one skilled in this field).

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
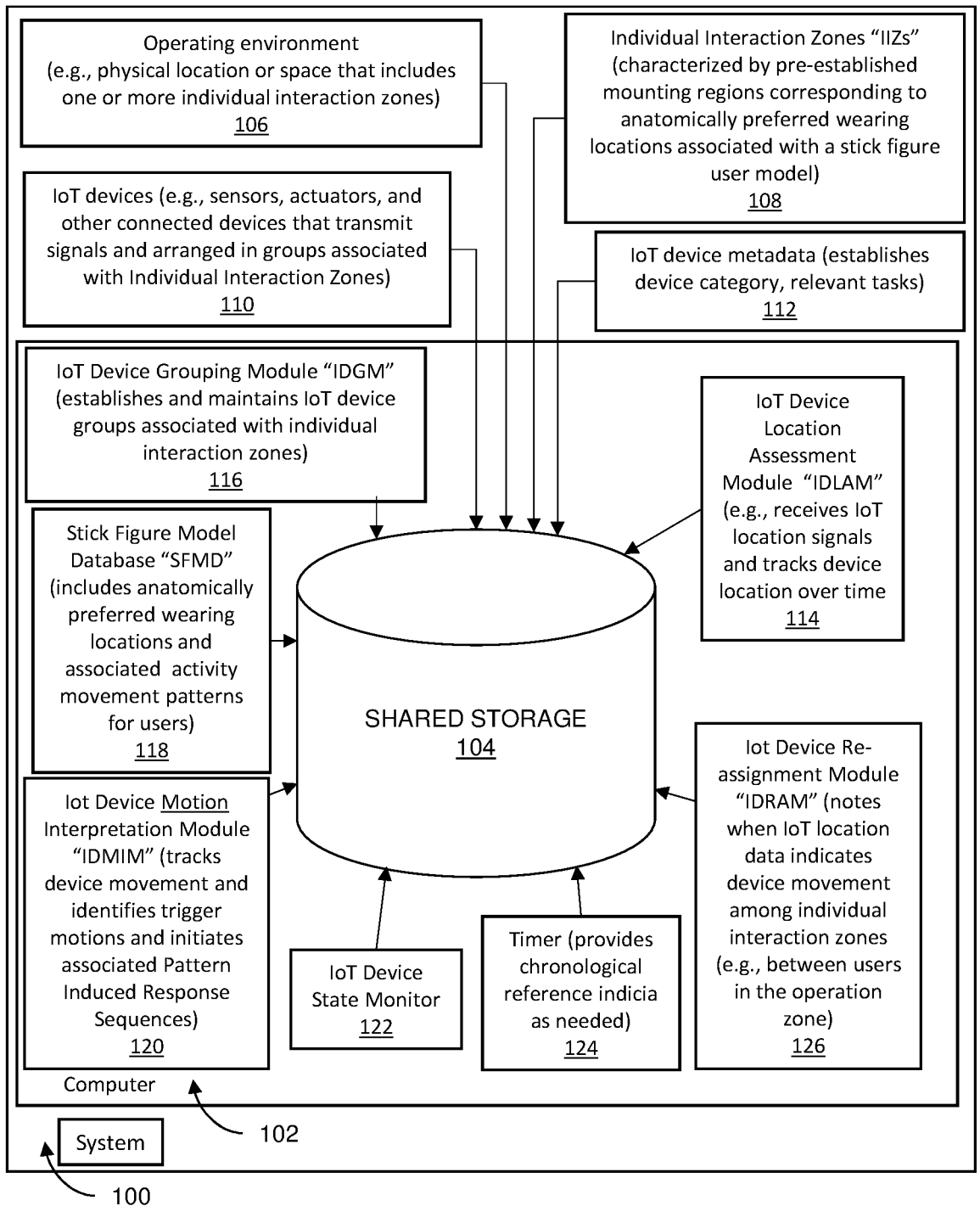
FIG. 1 is a schematic block diagram illustrating an overview of a system for a computer-implemented method of automatically assigning IoT devices to dynamic groups based on device location and motion relative to a user according to embodiments of the present invention.
Figure 2:
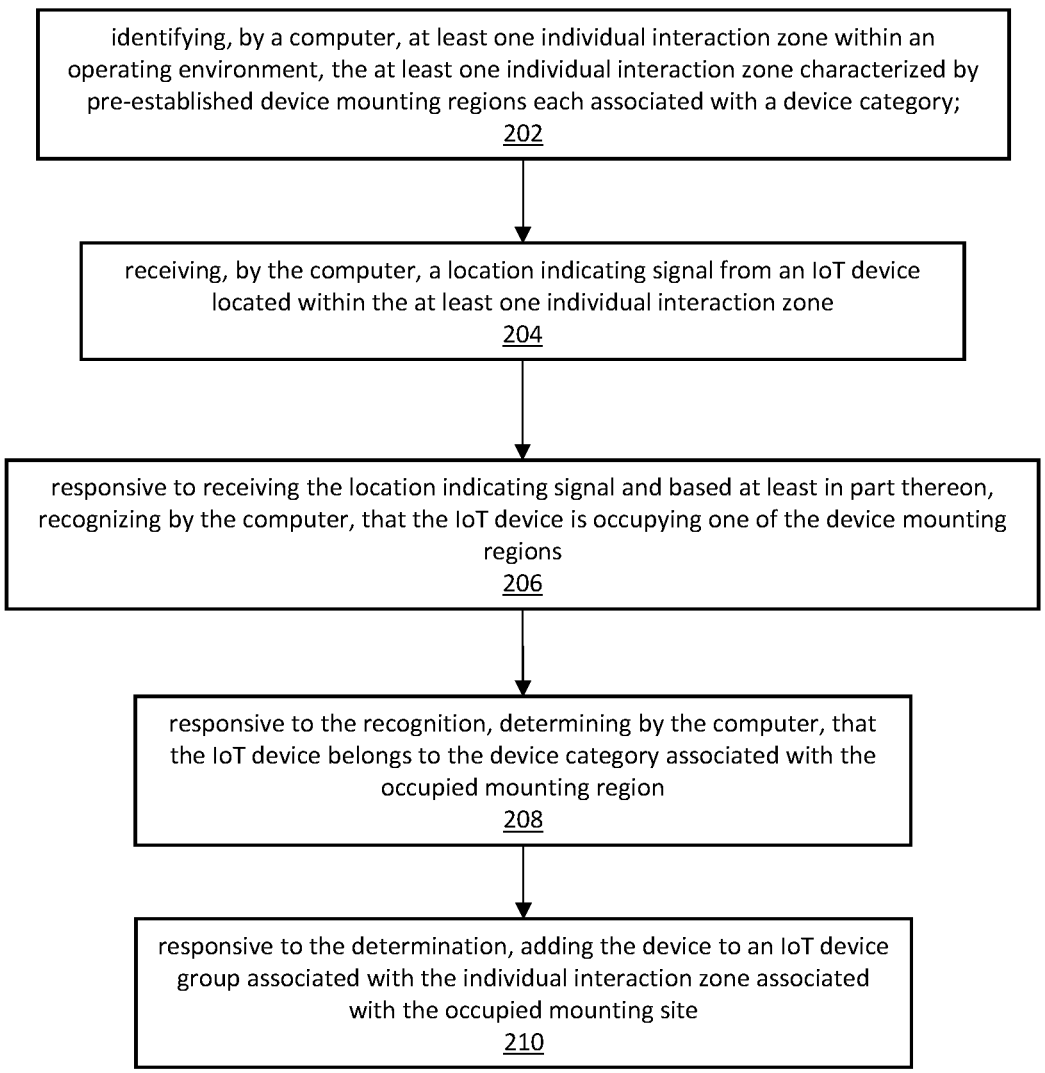
FIG. 2 is a flowchart illustrating a method, implemented using the system shown in FIG. 1, to automatically assign IoT devices to dynamic groups based on device location and motion relative to a user according to embodiments of the present invention.

Now with combined reference to the Figures generally and with particular reference to FIG. 1 and FIG. 2, an overview of a method to automatically assign IoT devices to dynamic groups based on device location and motion relative to a user usable within a system 100 as carried out by a server computer 102 having optionally shared storage 104 will now be provided.

The server computer 102 is in operative communication with an operating environment 106 (e.g., physical location or space that includes one or more dynamic Individual Interaction Zones "IIZs" 108 in which users carry out tasks and otherwise interact with IoT devices 110 and other equipment). It is noted that, as used herein, the term "IoT devices" includes includes sensors, actuators, and other networked or otherwise connected components, known to those skilled in this field as "connected devices." According to aspects of the invention, the IoT devices 110 transmit signals that identify the sensor, provide sensor output, and indicate sensor location; these devices signals are received by the server computer 102.

The server computer 102 is in communication with a source of IoT device metadata 112 (e.g., device category, relevant tasks, etc.). In an embodiment, the device metadata 112 is provided to the server computer 102, at least in part, via a signal transmitted by the IoT device 110. In another embodiment, the server computer 102 receives the device metadata 112, at least in part, from an IoT attribute database.

Figures 6, 7:
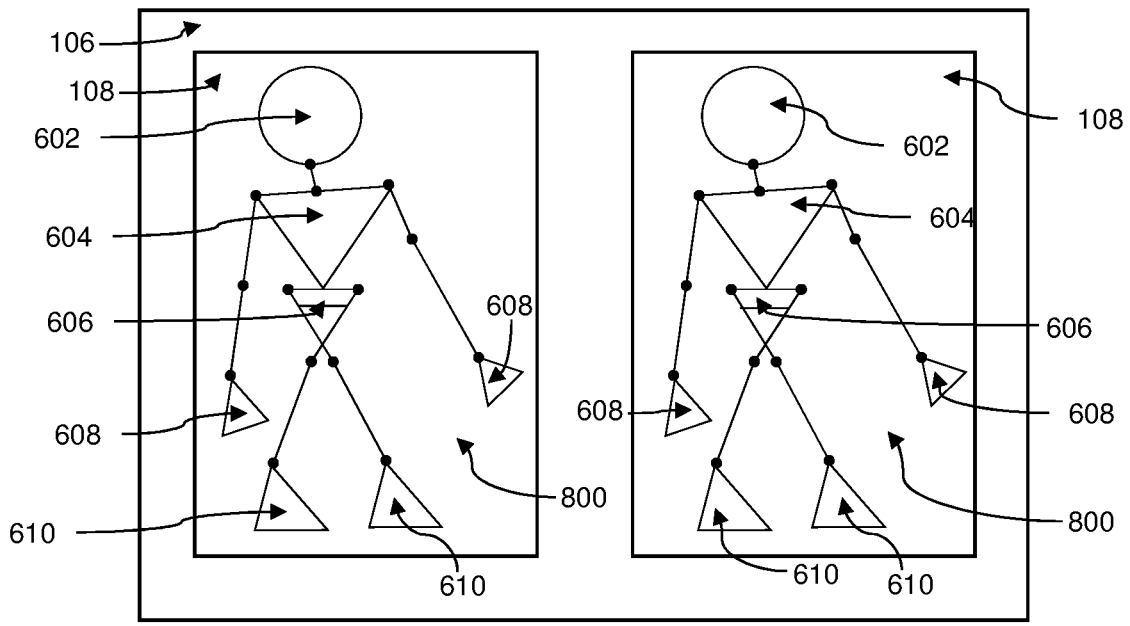
FIG. 6 is a schematic representation of a user stick figure models representing multiple users in respective individual interaction zones associated with an operating environment for implementation by the system shown in FIG. 1, to automatically assign IoT devices to dynamic groups based on device location and motion relative to a user according to embodiments of the present invention.
FIG. 7 is a table representing aspects of devices used relevant for the system shown in FIG. 1, to automatically assign IoT devices to dynamic groups based on device location and motion relative to a user according to embodiments of the present invention.

The server computer 102 is in operative communication with one or more Individual Interaction Zones "IIZs" 108 which, as noted above, are located within the operating environment 106. According to aspects of the invention, each IIZ 108 is characterized by pre-established, virtual mounting regions (e.g., head area 602, chest area 604, trunk area 606, hand area 608, foot area 610, as shown in FIG. 6) in which IoT devices 110 are typically located during system operation. According to aspects of the invention, these regions may be identified dynamically within a 2 or 3-dimensional Cartesian coordinate system (or other suitable location indexing method selected in accordance with the judgment of one skilled in this field) that represents the IIZ 108 in the operating environment 106.

Figure 8C:
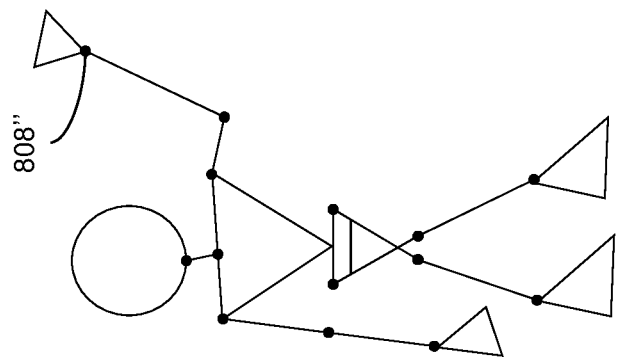
FIG. 8C is a schematic representation of a user stick figure model representing a user in a third orientation according to embodiments of the present invention.
Figure 8B:
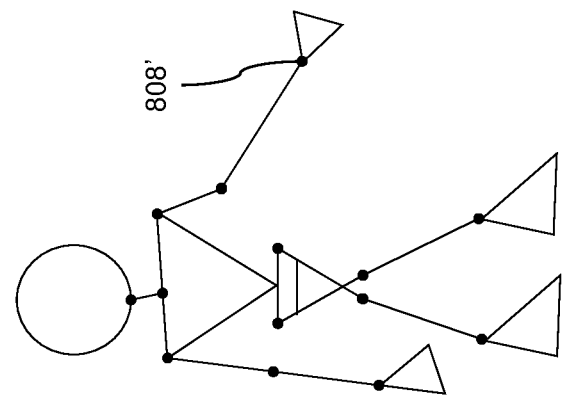
FIG. 8B is a schematic representation of a user stick figure model representing a user in a second orientation according to embodiments of the present invention.
Figure 8A:
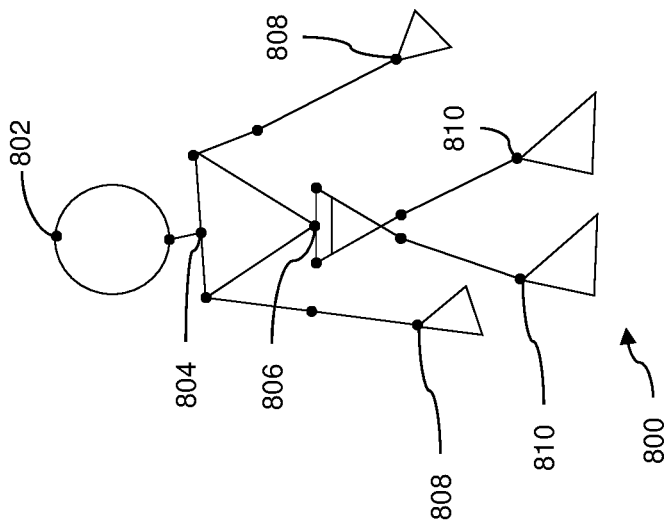
FIG. 8A is a schematic representation of a user stick figure model representing a user in a first orientation according to embodiments of the present invention.

According to aspects of the invention, the mounting regions substantially correspond to anatomically preferred wearing locations (top of head 802, top of torso 804, waist 806, wrist 808, ankle 810, etc., as shown in FIG. 8A) associated with system users. According to aspects of the invention, the regions (as shown, for example, in FIG. 6), resemble various shapes (circle, triangle, parallelogram, etc.) that provide approximate expected locations for selected human body parts (e.g., head, chest, waist, hands, feet, etc.) and, accordingly, IoT devices worn by users during system 100 operation.

The server computer 102 includes IoT Device Location Assessment Module "IDLAM" 114 that processes IoT device location signals and tracks IoT device 110 location over time during system operation.

The server computer 102 includes IoT Device Grouping Module "IDGM" 116 that establishes, and maintains during system operation, groups of IoT devices (e.g., a set of items worn by a given user, also known by those in this field as a user device ecosystem) associated with the individual interaction zones 108.

In an embodiment, system users are represented within a given IIZ 108 by a dynamic human stick figure model 800 (e.g., as shown in FIGS. 8A, 8B, and 8C). The server computer 102 includes a Stick Figure Model Database "SFMD" 118 which stores an articulated stick figure model for each expected user or team or users (e.g., an individual or group users for a given activity, job site location, work shift, etc.) expected in a given operating environment 106. According to aspects of the invention, the models are scale representations of users, thereby allowing the aspects of the present invention to accommodate a variety of body types (e.g., user heights, the presence or absence of particular limbs, etc.) and differing ranges of mobility for system users. In an embodiment, the SFMD 118 establishes limb size for a given user and provides relative body part device wearing locations (e.g., approximate joint locations, expected range of motion for individual limbs, etc.) for given user. According to aspects of the invention, the server computer 102 may have access to individual stick figure model for each expected user, and the model may be based, at least partially, on direct measurements taken of the user. It is noted that a generic stick figure model may be used when no user-specific model is available or desired. According to aspects of the invention, stick figure models 800 are created by taking physical measurements of the user. According to aspects of the invention, the stick figure models 800 are stored on a device owned by a user. According to aspects of the invention, the stick figure model are stored on an edge device in the operating vicinity of the user. According to aspects of the invention, it is expected that users will move during system operation, and the stick figure user model 800 is articulated to accommodate body orientation and movement of a user within an IIZ 108 during system operation. For example, FIGS. 8A, 8B, and 8C, collectively, show the movement of a user wrist wearing location 808, 808', and 808" from a low position 808 in FIG. 8A, through an intermediate position 808' in FIG. 8B, and into a raised location 808" in FIG. 8C.

The server computer 102 includes IoT Device Motion Interpretation Module "IDMIM" 120 that tracks motion of IoT devices 110 during system operation and identifies trigger motions (e.g., known sequences of movements, specific body poses) performed during system operation by users wearing monitored IoT devices 110. According to aspects of the invention, the IDMIM 120 initiates predetermined pattern induced response sequences (e.g., device pairing, activation of devices, etc.) when trigger motions are detected.

The server computer 102 includes an IoT Device State Monitor "IDSM" 122 that will identify a device state associated with IoT devices 110 capable of occupying multiple states (e.g., a secured state, a removed stated, etc.). In an embodiment, the IDSM notes the state condition of items like belts, cuffs, harnesses, and other devices that can be secured by a strap or other securing mechanism.

The server computer 102 includes a timer 124 (e.g., a clock or similar time indexing device) that provides chronological reference indicia as needed. According to aspects of the invention, the server computer 102 uses the timer 124 to generate timestamps for IoT device 110 attributes associated with different moments in time.

The server computer 102 includes IoT Device Re-Assignment Module "IDRAM" 126 that coordinates transference of IoT devices 110 among device groups when users pass (or otherwise transfer) devices amongst themselves. According to aspects of the invention, the IDRAM 126 is especially helpful for tracking portable tablets and other devices used by multiple users in series and facilitates accurate transfer among those users.

Now with specific reference to FIG. 2, and to other figures generally, a computer-implemented method of automatically grouping IoT devices using the system 100 described above will be described. The server computer 102 at block 202, identifies at least one individual interaction "IIZ" 108 zone within an operating environment 106. According to aspects of the invention, the IIZs 108 are characterized by pre-established device mounting regions 602, 604, 606, 608, 610 each associated with a device category 704 and preferred wearing location 706 (e.g., as shown in table 700 of FIG. 7). According to aspects of the invention the table 700 also includes the common device name 702 and relevant activities 708 associated with the IoT devices 108 being used within a given operating environment 106. In an embodiment, the information in table 700 is included as part of IoT device metadata 112. According to aspects of the invention, the IIZs are self-defining and bounded by a strategically selected signal strength of IoT devices being used by one individual user.

The server computer 102 via IoT Device Location Assessment Module "IDLAM" 114 a location indicating signal from an IoT device located within the at least one individual interaction zone. In particular, the IDLAM receives IoT location signals. According to aspects of the invention Each IoT device is identified uniquely, will have one or more IoT sensors, and will include a low power communication antenna. IoT sensors could include wind speed detector, cameras, gas monitors, etc. In an embodiment, the IoT 110 devices each include cooperative sensors that can identify relative position of the devices in 3D space. It is noted that in some settings, a surplus of IoT devices is available, and aspects of the present invention identify which of the available devices is being used.

The server computer 102, via IDLAM 114 at block 206, in response to receiving the location indicating signal and based at least in part thereon, recognizes that the IoT device is occupying one of the device mounting regions (e.g., head area 602, chest area 604, waist area 606, hand area 608, foot area 610, etc.). In an embodiment, the relative position and movement of all IoT devices 110 is sent to the surrounding IoT devices within specified threshold boundary (e.g., within each IIZ 108 or the overall operating environment 106).

The server computer 102, using device metadata 112 and in response to the recognition of a device being in one of the device mounting regions, determines at block 208 that an IoT device 110 belongs to the device category associated with the occupied mounting region. According to aspects of the invention, each type of device required in a given operating environment 106 will be classified uniquely based on where and how it is used, like gloves are wearing in hands, helmet is wearing in head etc. According to aspects of the invention, this information is available to the server computer 102 (e.g., as shown schematically in table 700) and may be included in device metadata 112 provided by signals from the IoT devices 110 or as part of a IoT device attribute database.

The server computer 102, in response to determining that the IoT device 110 belongs to the device category associated with the occupied mounting region, adds via IoT Device Grouping Module "IDGM" 116 at block 210, the device to an IoT device group associated with the individual interaction zone 108 associated with the occupied mounting region. According to aspects of the invention, the IDGM 116 establishes and maintains IoT device groups associated with individual interaction zones. According to aspects of the invention, the IoT devices 110 communicate with each other, and also, if a user opts in, user personal devices. In an embodiment, IoT device in a given device groups will be recognize other IoT devices in the same group (e.g., associated with a particular IIZ 108, the stick figure model 800 of a given user etc.). According to aspects of the invention, the devices 110 in a given device group are dynamically associated with a single user. In an embodiment, the server computer 102, via IDGM 116, automatically pairs each device in a given device group to the other devices in the device group. According to aspects of the invention, if an equipment list identified for current activity includes (as indicated, for example, in device metadata 112) devices not present in a device group associated with the activity, the server computer 102 will send an alert indicating the missing device status, allowing the user to take corrective action. It is noted that other responses selected by one skilled in this field may also be chosen. Aspects of the invention would, for example, alert a user to don a helmet if not present in the relevant device group when the user is undertaking a activity associated with helmet use. According to aspects of the invention, IoT devices in a given device group are paired to each other and share data among the devices in the group (e.g., the status of a tracked health condition, etc.), allowing the server computer to provide personalized recommendations for each user. According to aspects of the invention, the device metadata will identify which devices are appropriate for various activities. The server computer 102, via IoT Device Motion Interpretation Module "IDMIM" 120 will identify current user behavior as being associated with a given activity and determine which devices should be in a device group deemed to be undertaking various activities. If helmet wearing is indicated for an activity associated with a given IIZ 108 and a device group corresponding to that IIZ is missing a helmet, the server computer 102 generates an alert.

Figure 3:
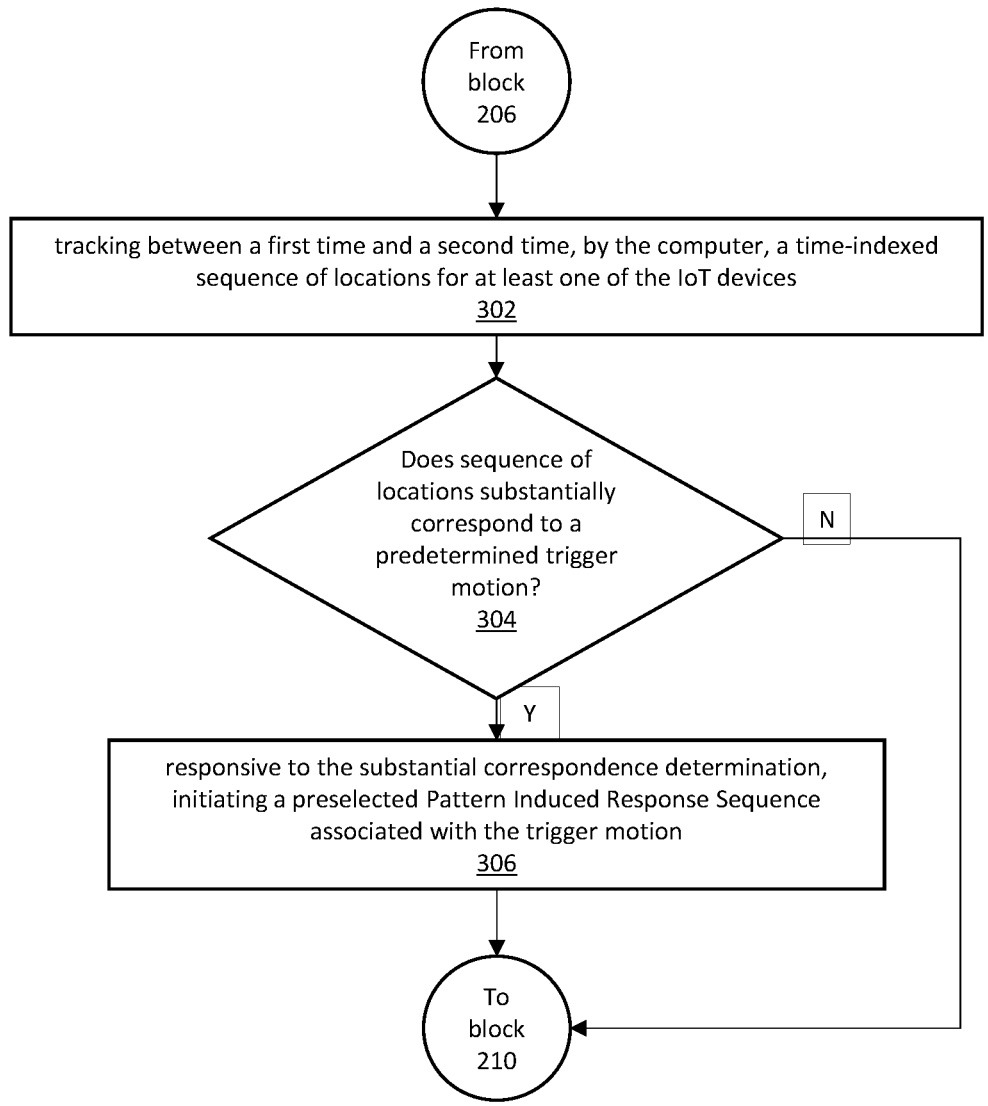
FIG. 3 is a flowchart illustrating selected aspects of a method, implemented using the system shown in FIG. 1, to automatically assign IoT devices to dynamic groups based on device location and motion relative to a user according to embodiments of the present invention.

In an embodiment shown in FIG. 3, the server computer 102 will initiate certain events when trigger motions are identified. In particular, flow logic branches from block 206 to block 302, and the server computer 102 via cooperation of the timer 124 and IoT Device Motion Interpretation Module "IDMIM" 120 tracks a time-indexed sequence of IoT device locations between a first time and a second time. According to aspects of the invention, images or videos expected users is captured to assist in the creation of a skeletal model of each worker stored in the Stick Figure Model Database "SFMD" 118. Different expected stick figure movements models are stored to identify when a user undertaking various activities (e.g., walking, sitting, hanging, holding an object, etc.). Based on image and video analysis, user movement models are identified and stored in the SFMD 118. The server computer 102 uses movement and position information to correlate devices to various body locations. It is noted that, various stick figure dimensions can be used to increase device disambiguation accuracy (e.g., the model associated with a given user may indicate limbs of a certain length, width, and so forth). It is also noted that some user models will have a personalized set of sizes associated with shoe size, glove size, belt size, and so forth. The SFMD 118 may also process information about device buckling clip preferences (e.g., whether one may engage more tightly (or loosely) because of smaller (or larger) arm size, as when using blood pressure cuffs and similar devices). In an embodiment, the server computer 102, via IDLAM 114 tracks device movement to ensure user safety (e.g., are users moving in a within preferred, ergonomically prescribed ranges of motion, etc.). According to aspects of the invention, model accuracy is enhanced by processing information about motions expected within multi-user groups (e.g., teams of users), allowing multiple device groups to be generated, with a device group being associated with each team member. Aspects of the SFMD 118 record user stride and gait, allowing the IDMIM 120 to process activities that occur while a user is walking and running (as noted, for example with information from an accelerometers), in addition to motions where the user stays substantially in one location. At block 304, the IDMIM 120 determines whether the sequence of locations substantially correspond to a predetermined trigger motion (e.g., raised hand, foot position, limbs moving in a particular manner at a particular speed, etc.). The IDMIM 120 at block 306, in response to determining that the tracked device motion substantially matches a digitized representation of trigger motion assigned to the stick figure model of the current user, initiates a preselected pattern induced response sequence associated with the trigger motion. For example, a trigger motion (e.g., a "capture photo" trigger or a "pair devices" trigger) according to aspects of the invention may include, while the user is wearing a preferred belt device on his waist 806 the user moves his arm so that a device in the hand region 608 follows user wrist motion from a low position 808 (as shown, e.g., in FIG. 8A), through an intermediate position 808' (as shown, e.g., in FIG. 8B), and into a raised position 808". According to aspects of the invention, many aspects of activities may qualify the activity as a trigger motion, including location and timing of activities, relative movement of the IoT devices, associated activity time interval, and so forth. The pattern induced response sequence associated with these trigger motions could be to take a photo using a recording device associated with the system 100, to pair all devices present in appropriate mounting regions, validating whether devices currently assigned to location-matching device groups are correctly grouped (e.g., determining at a second time whether a given IoT device belongs to the device category associated with the mounting region occupied at a second time), and other sequences selected according to the judgment of one skilled in this field. It is noted that simple motion may trigger a power on cycle for devices with dynamic power switching capability. After the response sequence is initiated, the server computer 120 returns flow control back to block 210.

Figure 4:
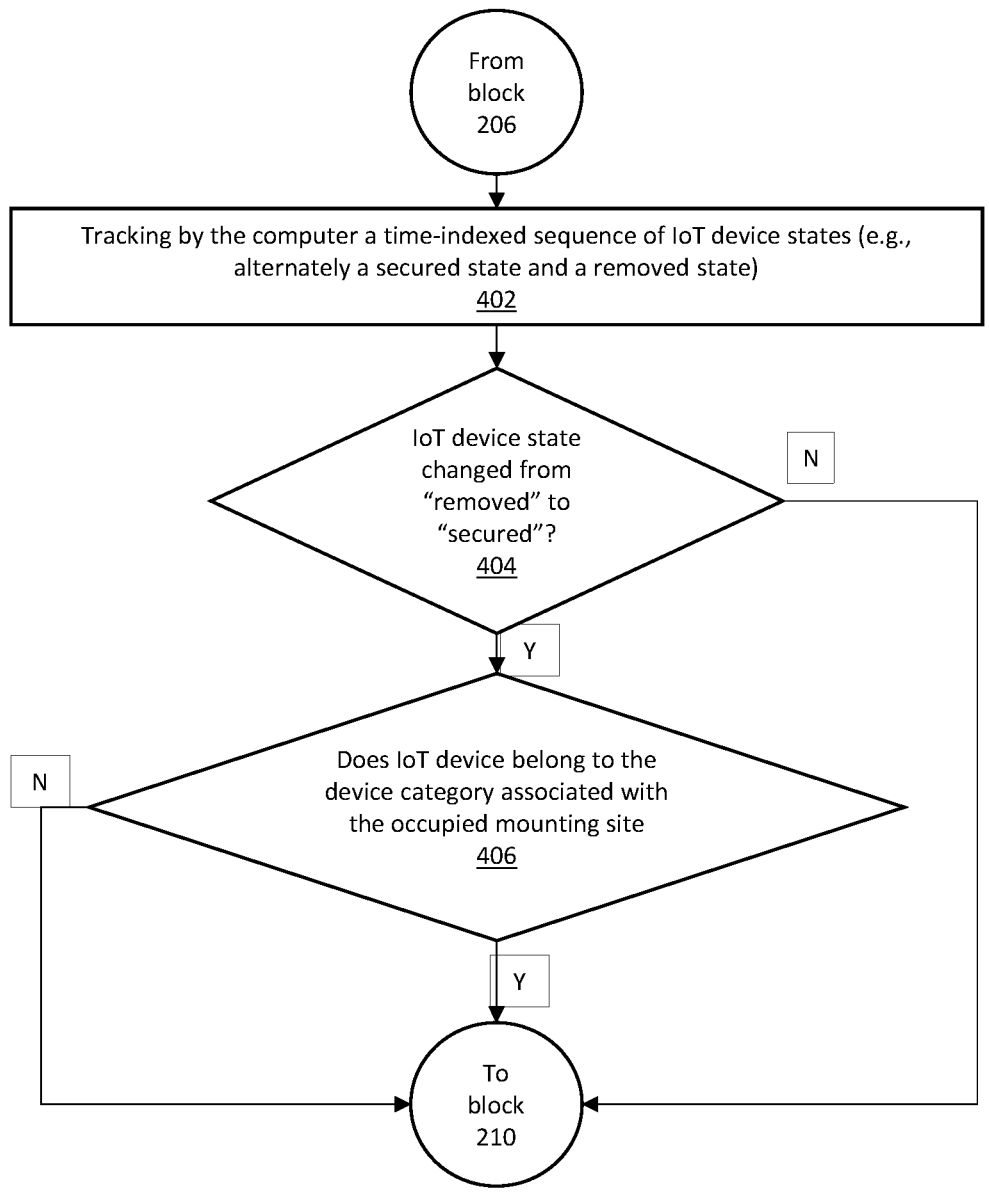
FIG. 4 is a flowchart illustrating selected aspects of a method, implemented using the system shown in FIG. 1, to automatically assign IoT devices to dynamic groups based on device location and motion relative to a user according to embodiments of the present invention.

In an embodiment shown in FIG. 4, the server computer 102 assesses proper device categorization when a device is cycled from a removed stat to a secured state. In particular, flow logic branches from block 206 to block 402, and the server computer 102, via IoT Device State Monitor "IDSM" 122 tracks a time-indexed sequence of IoT device states. The IDSM 122 determines at block 404 whether a selected IoT device 110 state has changed from "removed" to "secured" during the sequence, and if it has, flow control continues to block 406, and the IDSM 122 determines whether the IoT device 110 belongs to the category 704 associated with the mounting region in which the device is located. This determination is carried back to 210, and processing flow continues. Aspects of this embodiment allow the securing of an IoT device to initiate device category/mounted location match analysis. If the IDSM 122 determines at block 404 that the IoT device has not switched from a removed state to a secured state, flow travels directly back to block 210.

Figure 5:
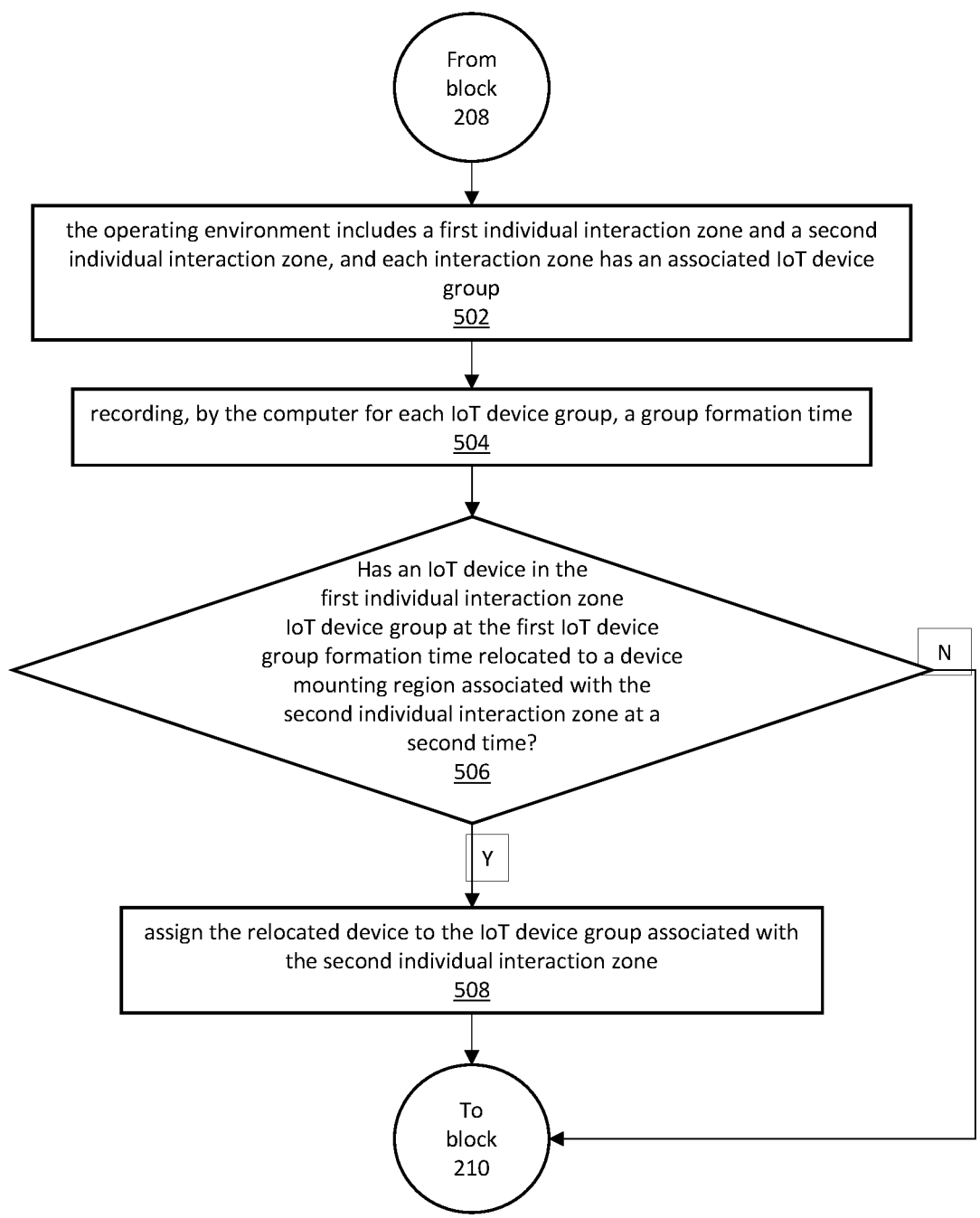
FIG. 5 is a flowchart illustrating selected aspects of a method, implemented using the system shown in FIG. 1, to automatically assign IoT devices to dynamic groups based on device location and motion relative to a user according to embodiments of the present invention.

In an embodiment shown in FIG. 5, the server computer 102, via IoT Device Re-Assignment Module "IDRAM" 126 identifies device movement from one user to another. In particular, the server computer 102 notes when IoT location data indicates device movement among individual interaction zones 108 (e.g., between users in the operation zone). According to aspects of this embodiment, IDRAM 126 tracks the historic presence of IoT devices 110, along with the duration and type of activity when those devices are present, and uses a machine learning model trained with this data to identify suitable time interval to assess device group content. According to aspects of this embodiment, flow logic branches from block 208 to block 502, and the computer 102 notes that the operating environment 106 multiple individual interaction zones 108 and that each interaction zone has an associated IoT device group. The IDRAM 126, in cooperation with the timer 124, records at block 504 a group formation time for each IoT device group. The IDRAM 126 determines, at block 506, whether an IoT device in the first individual interaction zone IoT device group at the first IoT device group formation time has been relocated to a device mounting region associated with the second individual interaction zone at a second time. If such a relocation has occurred, the IDRAM 126 assigns, at block 508, the relocated device to the IoT device group associated with the second individual interaction zone, and processing flow returns to block 210. If no such relocation occurs, processing flow returns from block 506 directly to block 210.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
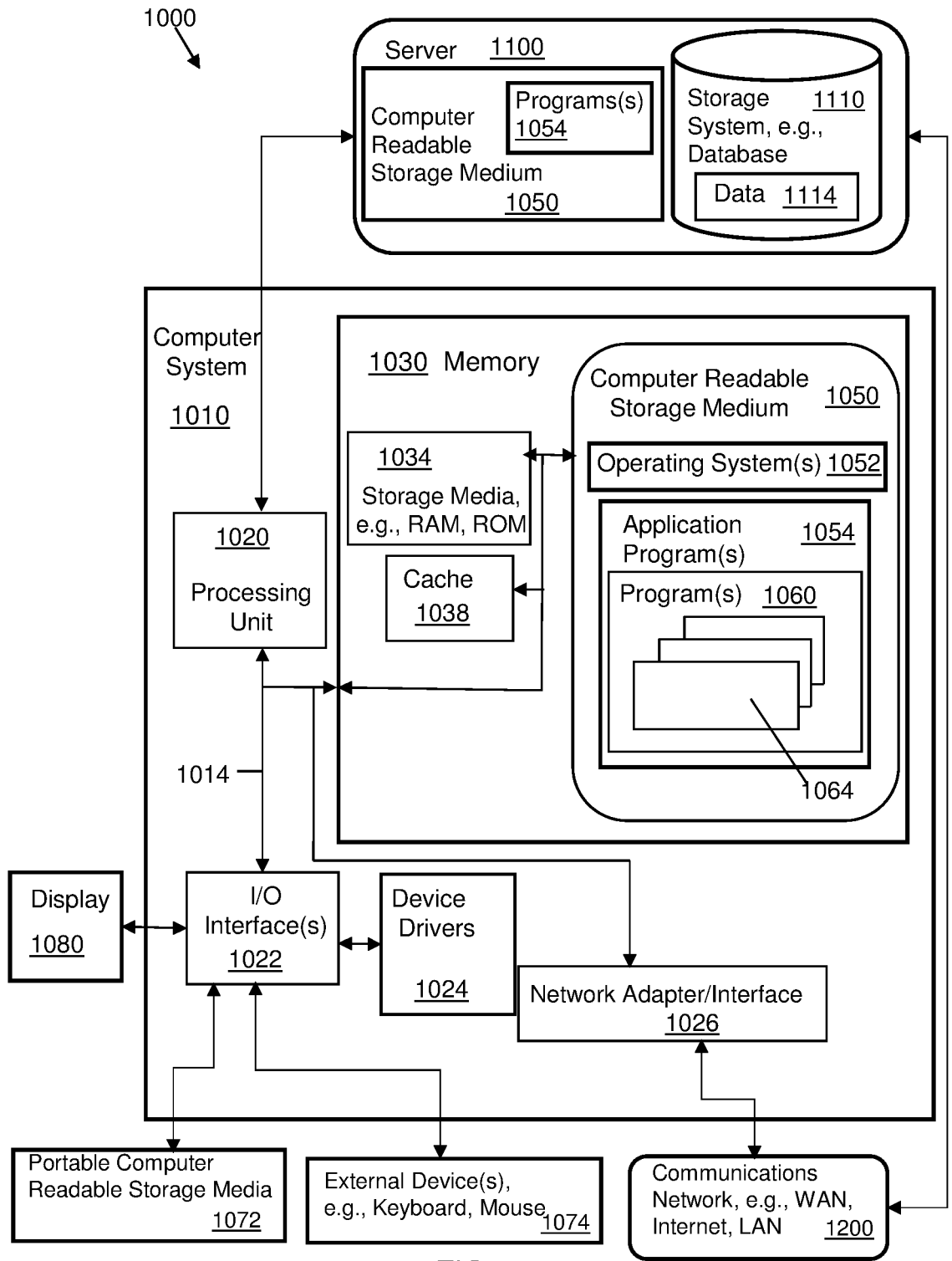
FIG. 9 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 9, a system or computer environment 1000 includes a computer diagram 1010 shown in the form of a generic computing device. The method of the invention, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
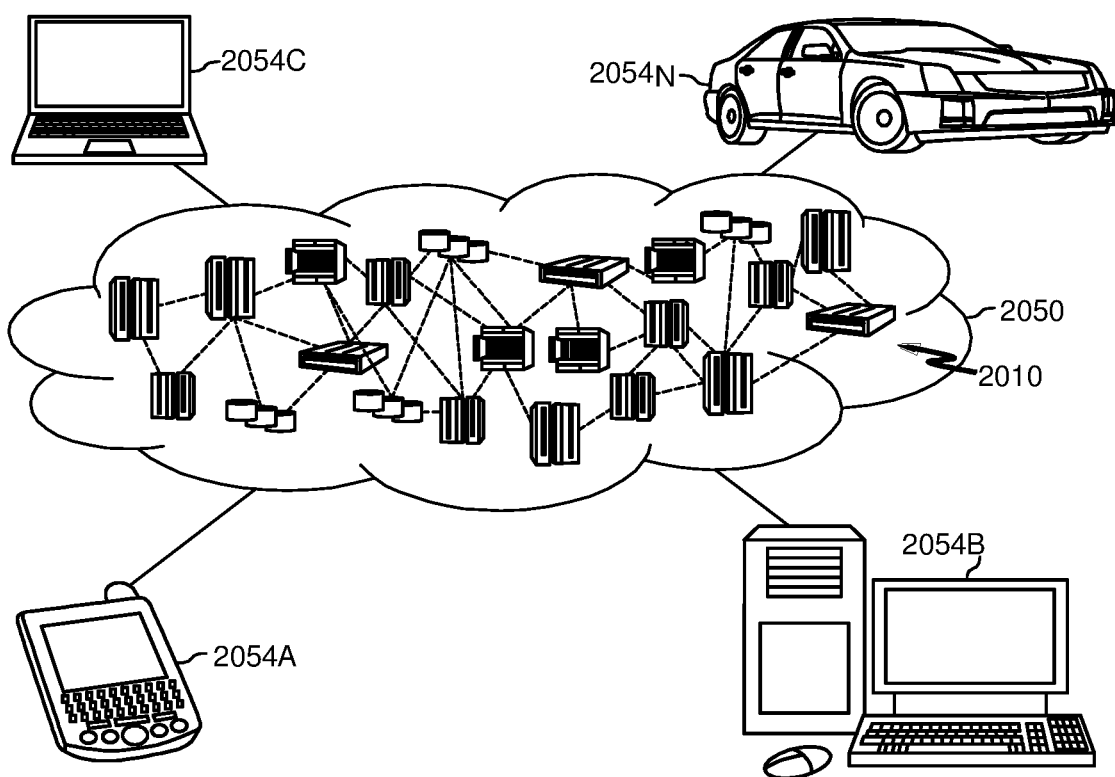
FIG. 10 depicts a cloud computing environment according to an embodiment of the present invention.

Referring now to FIG. 10, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 11:
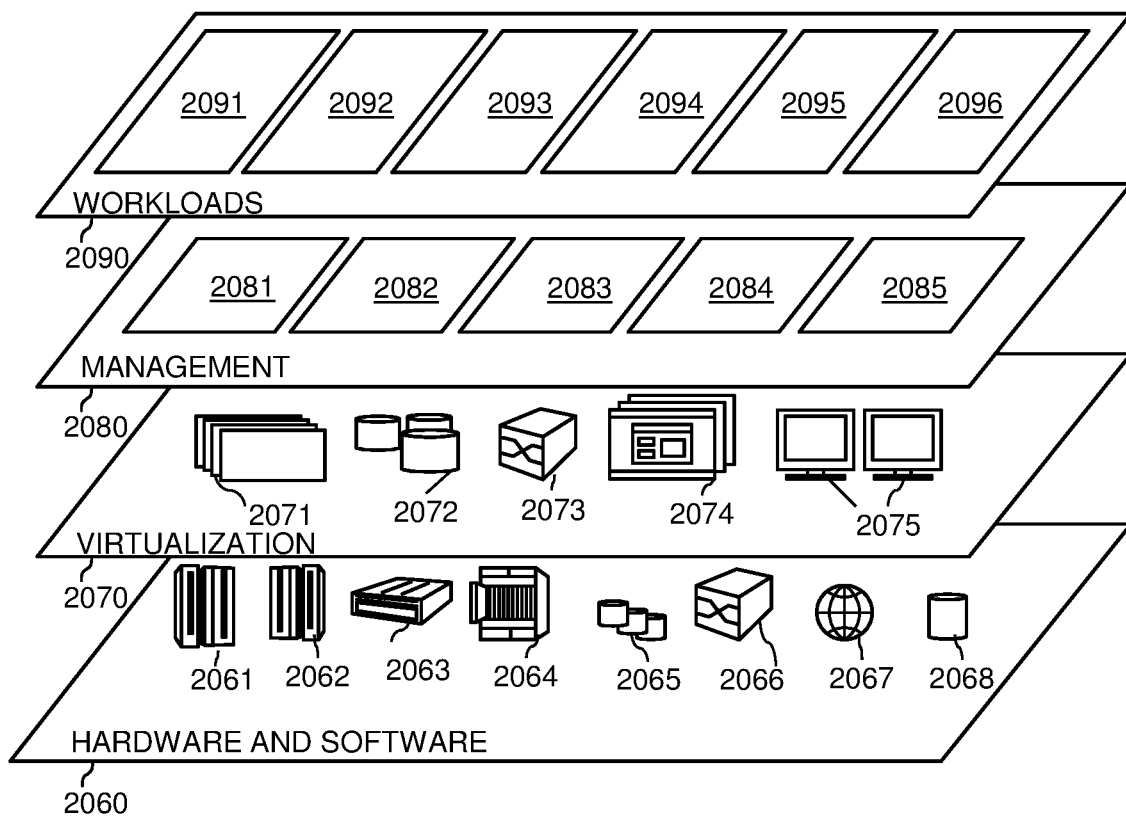
FIG. 11 depicts abstraction model layers according to an embodiment of the present invention.

Referring now to FIG. 11, a set of functional abstraction layers provided by cloud computing environment 2050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and assigning IoT devices to dynamic groups based on device location and motion relative to a user 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of automatically grouping IoT devices, comprising:
    identifying, by a computer, at least one individual interaction zone within an operating environment, the at least one individual interaction zone characterized by pre-established device mounting regions each associated with a device category;
    receiving, by the computer, a location indicating signal from an IoT device located within the at least one individual interaction zone;
    responsive to receiving the location indicating signal and based at least in part thereon, recognizing by the computer, that the IoT device is occupying one of the device mounting regions;
    responsive to the recognition, determining by the computer, that the IoT device belongs to the device category associated with the occupied mounting region; and
    responsive to the determination, adding the device to an IoT device group associated with the individual interaction zone associated with the occupied mounting region.

2. The method of claim 1, wherein: the mounting regions substantially coincide with anatomically preferred device wearing locations associated with a stick figure model representing a user.

3. The method of claim 1, further including:
    tracking, by the computer, between a first time and a second time, a time-indexed sequence of locations for at least one of the IoT devices;
    determining, by the computer, the sequence of locations substantially corresponds to a predetermined trigger motion; and
    responsive to the substantial correspondence determination, initiating a preselected pattern induced response sequence associated with the trigger motion.

4. The method of claim 1, wherein the IoT device is adapted to alternately occupy a secured state and a removed state, further including:
    tracking, by the computer, between a first time and a second time, by the computer, a time-indexed sequence of IoT device states; and
    wherein the determining that the IoT device belongs to the device category associated with the occupied mounting region occurs in response to the computer recognizing that the device state has changed from removed to secured.

5. The method of claim 1, wherein the at least one individual interaction zone includes a first individual interaction zone and a second individual interaction zone, and wherein the first and second interaction zones each have an associated IoT device group.

6. The method of claim 5, further including:
    recording, by the computer for each IoT device group, a group formation time;
    determining, by the computer at a second time, that an IoT device in the first individual interaction zone IoT device group at the first IoT device group formation time has relocated to a device mounting region associated with the second individual interaction zone; and
    responsive to the relocation determination, assigning by the computer, the relocated device to the IoT device group associated with the second individual interaction zone.

7. The method of claim 3, wherein the pattern induced response sequence includes determining by the computer at the second time whether the IoT device belongs to the device category associated with the occupied mounting region.

8. The method of claim 3, wherein the pattern induced response sequence includes, enacting a capture activity associated with the IoT device.

9. A system to automatically group IoT devices, which comprises:
    a computer system comprising a computer readable storage medium having program instructions embodied therewith, the program instructions executable by a computer to cause the computer to:

identify at least one individual interaction zone within an operating environment, the at least one individual interaction zone characterized by pre-established device mounting regions each associated with a device category;

receive a location indicating signal from an IoT device located within the at least one individual interaction zone;

responsive to receiving the location indicating signal and based at least in part thereon, recognizing that the IoT device is occupying one of the device mounting regions;

responsive to the recognition, determining that the IoT device belongs to the device category associated with the occupied mounting region; and responsive to the determination, adding the device to an IoT device group associated with the individual interaction zone associated with the occupied mounting region.

10. The system of claim 9, wherein: the mounting regions substantially coincide with anatomically preferred device wearing locations associated with a stick figure model representing a user.

11. The system of claim 9, further including:

tracking, by the computer, between a first time and a second time, a time-indexed sequence of locations for at least one of the IoT devices;

determining, by the computer, the sequence of locations substantially corresponds to a predetermined trigger motion; and responsive to the substantial correspondence determination, initiating a preselected pattern induced response sequence associated with the trigger motion.

12. The system of claim 9, wherein the IoT device is adapted to alternately occupy a secured state and a removed state, further including:

tracking, by the computer, between a first time and a second time, by the computer, a time-indexed sequence of IoT device states; and wherein the determining that the IoT device belongs to the device category associated with the occupied mounting region occurs in response to the computer recognizing that the device state has changed from removed to secured.

13. The system of claim 9, wherein the at least one individual interaction zone includes a first individual interaction zone and a second individual interaction zone, and wherein the first and second interaction zones each have an associated IoT device group.

14. The system of claim 13, further including instruction causing the computer to:

record for each IoT device group, a group formation time;

determine, at a second time, that an IoT device in the first individual interaction zone IoT device group at the first IoT device group formation time has relocated to a device mounting region associated with the second individual interaction zone; and responsive to the relocation determination, assign the relocated device to the IoT device group associated with the second individual interaction zone.

15. The system of claim 11, wherein the pattern induced response sequence includes determining by the computer at the second time whether the IoT device belongs to the device category associated with the occupied mounting region.

16. A computer program product to automatically group IoT devices, the computer program product comprising a computer readable storage medium having program instructions embodied therewith, the program instructions executable by a computer to cause the computer to:

identify, using the computer, at least one individual interaction zone within an operating environment, the at least one individual interaction zone characterized by pre-established device mounting regions each associated with a device category;

receive, using the computer, a location indicating signal from an IoT device located within the at least one individual interaction zone;

responsive to receiving the location indicating signal and based at least in part thereon, recognizing, using the computer, that the IoT device is occupying one of the device mounting regions;

responsive to the recognition, determining, using the computer, that the IoT device belongs to the device category associated with the occupied mounting region; and responsive to the determination, adding, using the computer, the device to an IoT device group associated with the individual interaction zone associated with the occupied mounting region.

17. The computer program product of claim 16, wherein: the mounting regions substantially coincide with anatomically preferred device wearing locations associated with a stick figure model representing a user.

18. The computer program product of claim 16, further including:

tracking, using the computer, between a first time and a second time, a time-indexed sequence of locations for at least one of the IoT devices;

determining, using the computer, the sequence of locations substantially corresponds to a predetermined trigger motion; and responsive to the substantial correspondence determination, initiating, using the computer, a preselected pattern induced response sequence associated with the trigger motion.

19. The computer program product of claim 16, wherein the IoT device is adapted to alternately occupy a secured state and a removed state, further including:

tracking between a first time and a second time, by the computer, a time-indexed sequence of IoT device states; and wherein the determining that the IoT device belongs to the device category associated with the occupied mounting region occurs in response to the computer recognizing that the device state has changed from removed to secured.

20. The computer program product of claim 16, wherein the at least one individual interaction zone includes a first individual interaction zone and a second individual interaction zone, and wherein the first and second interaction zones each have an associated IoT device group.

* * * * *